United States Patent Office 2,983,593
Patented May 9, 1961

2,983,593

ADHESIVE COMPOSITIONS AND PRODUCTS

Bruce W. Duke, Troy, N.Y., assignor to Norton Company, Troy, N.Y., a corporation of Massachusetts No Drawing. Filed Mar. 2, 1959, Ser. No. 796,270

7 Claims. (Cl. 51—298)

My invention relates to novel adhesive compositions and to improved coated abrasive products made from these compositions as coating adhesives. In particular it relates to urea aldehydes or other similar aminoplast resins.

In the use of such resins a so-called "pre-condensate" of urea and formaldehyde, or urea and melamine and formaldehyde in a solvent such as water is mixed with a catalyst and applied as desired and then heated to bring the resin to the desired state of cure. In many applications of such resins the "pot-life" of the pre-condensate-curing agent mixture is of great importance, in that the viscosity of the resin should not change appreciably until after application. For example in the manufacture of coated abrasives or in other operations where a continuous length of web material is coated, in order to produce uniform results, it is necessary that the viscosity of the adhesive being applied to the web be substantially the same during all of the time that the material is being coated, to insure uniformity of the coating operation.

In the past, considerable difficulty has been experienced in the use of urea-formaldehyde and such like resins in certain applications because of the limited pot life of such materials particularly when formulated to give desired end properties and curable at practicable temperatures. In particular in the manufacture of coated abrasives the aminoplast resins have found little applicability because of this difficulty which appeared to be inherent in the use of such products.

Although by using small quantities of catalysts it has been possible to increase the pot life of such resins, the use of this expedient requires high temperatures or excessively long curing time at lower temperatures to effect a cure of the resins. The use of high temperatures is not only expensive but also may result in undesirable final properties of the cured resin. Also other factors such as heat sensitivity of the particular material to which the adhesive is applied may require the avoidance of a high temperature curing operation.

Another method of increasing the effective pot life of urea-formaldehyde and like resins may be by decreasing the concentration of the resin in the solution being used. Such an expedient, although practical for some uses, is not a solution to the problem where a high solids content of the resin is necessary. Such operations in which a relatively high solids content of the applied adhesive is required are exemplified by the coating of backing material in the manufacture of coated abrasives.

It is therefore an object of my invention to provide an improved adhesive composition adapted to be cured at relatively low temperature, having good viscosity stability, high solids content before cure, and satisfactory properties when in the cured state.

It is a further object of my invention to provide an improved adhesive coating composition and improved coated products produced therefrom.

Still another object of my invention is to produce a craze resistant film from the cured pre-condensate curing agent mixtures. This feature is an extremely important one, since it is characteristic of most urea-aldehyde adhesives to craze and break-up over very short periods of time. I have found however that films made from my adhesive systems are clear from crazing and will retain their original superior physical properties over long periods of time.

Accordingly my invention provides a means whereby urea-formaldehyde or other similar acid curing pre-condensates may be used where a long pot life, a low temperature cure, and a high solids content of the applied material are all necessary or desirable.

I have discovered that by the use of certain hydroxy or ether amine compounds I may materially increase the viscosity stability at room temperatures and higher of aminoplast resins. I find that by adding these particular amines, together with an acid forming catalyst to the urea-formaldehyde pre-condensate, I produce a material which while stable at working temperatures, may be cured to the required degree at relatively low temperatures such as around 175° F.

According to my invention I add an amine, characterized by having a primary amino group attached to a tertiary carbon atom and one or more oxygen atoms (as hydroxyl or ether linkage) two carbon atoms removed from the amine group, to a urea formaldehyde pre-condensate together with an ammonium salt of an acid. In general, I prefer formulations in which the amine is added in quantities in excess on a mol for mol basis, of the amount of free hydrogen ion from the ammonium salt added to the resin and stabilizer mixture.

Amino compounds which I have found useful in my invention are:

(1) 2-amino 2-methyl 1-propanol
(2) 2-amino 2-methyl 1,3-propanediol
(3) Tris (hydroxymethyl) aminomethane
(4) 5-amino 5-methyl 1,3-dioxane
(5) 2-amino 2-ethyl 1,3-propanediol As the acid catalyst in my invention I may use ammonium chloride, ammonium thiocyanate, ammonium sulphate, ammonium nitrate, ammonium oxalate, and ammonium bromide, or other suitable salts of ammonia in which the acid has a dissociation constant of at least $1 \times 10^{-4}$.

The acid salts of at least the first three above named amino compounds have in the past been proposed to be used as latent curing catalysts for aminoplasts. These salts as hydrochlorides or phosphates yield a pH in solution varying from approximately 4.4 to 6.0. Such salts, although better for purposes of good pot life than the straight acids or the buffer systems previously employed as curing agents for aminoplasts, suffer from several defects and do not achieve the objects of my invention.

Where such acid salts of beta-hydroxy amines or other amines are employed per se as the latent curing catalyst I find that when the curing agent is reduced to small enough quantities to give a completely satisfactory pot life, the resulting cured adhesive does not possess the desired degree of tensile strength, flexibility, and abrasion resistance required for a number of applications such as adhesives for making coated abrasives. Conversely, where a sufficient amount of the amine salt is added to give the proper physical characteristics of strength, flexibility and abrasion resistance, the pot life is impaired to the point of compromise in application times and processing facility.

Other curing agents have been employed for urea aldehyde precondensates which have been totally neutral or alkaline such as a mixture of monoethanolamine and diethanolamine, both free and as water soluble salts. While the pot life of such adhesive curing agent mixtures is excellent, the time-temperature relationship to effect a cure is high and the physical properties of the resulting adhesives are not outstanding.

I have found that the method of addition of the individual components in my adhesive system is important. Preferred results are obtained by adding the beta-hydroxyamine to the urea aldehyde precondensate and then adding the ammonium salt of the acid to the beta-hydroxyamine-urea aldehyde mixture.

I have found that if formulations are used wherein certain beta-hydroxyamines are utilized and are present in excess on a mol for mol basis of the free hydrogen ions present, I am able to produce pre-condensate systems with greatly improved pot life over any previously known systems as well as yielding cured adhesives and products made with these adhesives with excellent tensile strength, flexibility, abrasion resistance and physical property retention on aging. Where polyamino compounds are employed in lieu of the monoamines, having the same basic configuration as the beta-hydroxyamines described above, the amino compound must be added to provide an excess of amino equivalents to the free hydrogen ions present. As a result of adding the beta-hydroxyamine in excess of the free hydrogen ion, in accordance with the teaching of my invention, the pH of the system prior to curing, will be above 6 and in the range of 6 to 9.

While the exact method or mechanics of the reaction between the beta-hydroxyamine, urea aldehyde pre-condensate and ammonium salt of the acid is not known with absolute certainty, it is my belief that it parallels and is analogous to the reaction in the condensation of urea and formaldehyde. It is known that the kinetics of urea-aldehyde polymerization is governed to a considerable degree by the amount of hydrogen ion present at any given instant. In systems employing alcohol amine salts, such as a mixture of triethanolamine and hydrochloric acid, or in acid curing agent systems, a pure acid catalytic effect is predominant, and the rate of reaction is proportional to the hydrogen ion concentration. However, under neutral or alkaline conditions, as in the present invention, the acid curing and thermal curing reactions occur together. Since, not only the initial acidity, but the released or generated acidity in the beta-hydroxyamine, urea aldehyde pre-condensate, ammonium salt catalyst solution is made available under controlled condition, the final reaction involving the catalyzation of the pre-condensate yields a more stable adhesive solution and thereinafter, yields resinous films whose initially improved properties are retained over long periods of time.

Using the novel teachings of my invention wherein the beta-hydroxyamine is in stoichiometric excess to the free hydrogen ion, I have found that the application bath is stable over a considerable period of time at temperatures usually employed (100–120° F.) in application or coating work, yet will allow a cure of this system at slightly elevated temperatures. By the use of these systems it has now become possible to adjust the pH of the pre-condensate curing agent mixture to alkaline pH value up to 9 and above which allows me to obtain a stabilized pre-condensate mixture which will cure rapidly at slightly elevated temperatures (175° F.).

Although my improved catalyst-stabilizer system has particular use with urea-formaldehyde resins and melamine-urea-formaldehyde resins obviously it is applicable in general to condensation resins of aminoplasts which require an acid catalyst.

*Example I*

To 151.7 parts of a urea-formaldehyde resin pre-condensate in water, having a solids content of 66%, I add: 2 parts of $NH_4SCN$ and 8 parts of 2-amino 2-methyl 1,3-propanediol.

The viscosity of this solution does not increase over a period of ten hours at 100° F. The material will, however, rapidly cure to a thermoset condition when subjected to a slightly elevated temperature such as 175° F.

*Example II*

To 151.7 parts of a urea formaldehyde resin pre-condensate in water, having a solids content of 66%, I add: 2 parts of $NH_4SCN$ and 5 parts of 2-amino 2-methyl 1,3-propanediol.

The above solution had sufficient stability to be used as a size coat in the manufacture of coated abrasives, but cured rapidly at 175° F.

*Example III*

To 154 parts of a urea formaldehyde resin pre-condensate in water having a solids content of 65%, I add:

6.4 parts $NH_4Cl$ (25% aqueous solution)
2 parts 2-amino-2-methyl-1-propanol
93.6 parts of air floated clay—average particle size 8.6 microns (Georgia Kaolin Co., Elizabeth, New Jersey)

The viscosity of this solution was 4130 centipoises at 100° F. The pH of this solution is 6.4.

The amount of curing agent added is not critical, it being a particular feature of my invention that for a given ratio of ammonium salt to amine I am able to obtain longer pot life by increasing the level of ammonium salt and amine with respect to the resin. In previous latent catalyst systems known to me, I have found that increasing the amount of latent catalyst with respect to resin results in shorter, rather than longer pot life.

It is not known for certain just why this surprising relationship between pot life and catalyst-stabilizer level should be obtained. However, it appears to be a unique feature of my invention that hydrogen ion is generated from the reaction of ammonium salt catalyst with the free formaldehyde of the resin in the presence of the aforesaid type of hydroxy or ether amine. In the case of some previous latent catalyst systems wherein hydrogen ion is incorporated into the resin in the form of an amine salt of an acid, the hydrogen ion concentration is determined simply by the amount of amine salt used. On the contrary, in my invention, the amount of hydrogen ion is determined by the quantities of ammonium salt, amine and the free formaldehyde in the resin. Thus, it may be seen that doubling the amount of ammonium salt and amine in a given quantity of resin will not result in twice the amount of hydrogen ion since the concentration of formaldehyde has remained the same. Furthermore, since the ratio of amine to hydrogen ion has actually increased, an increase of pH will occur which considerably lengthens the time required for the pH to fall to the region of 6 and below where rapid advancement of the resin takes place. As a result, I obtain a longer pot life at higher levels of catalyst and stabilizer.

An aminoplast resin which I may employ as in the above examples was prepared as follows:

To 50 grams of formalin (37% formaldehyde) were added 18.6 grams of urea. The pH was adjusted from an initial 4.8 to 8.2 with aqueous NaOH. The mixture was heated at reflux for two hours and then 16 ml. of water were removed by distillation at atmospheric pressure over a period of 25 minutes. The pH, which had reached 6.95 was adjusted to 7.6 with aqueous NaOH.

Other suitable resins are:

Resimene R–AO33 and Resimene R–AO32, sold by Monsanto, and Casco 5H sold by the Borden Company.

The coating compositions of my invention are particularly useful in providing the maker, and/or size coat in the manufacture of flexible coated abrasives. For example, in one of its most useful applications, I may coat a typical paper, cloth or other conventional coated abrasive backing with a maker coat of glue or glue and filler material such as disclosed in U.S. Patent 2,322,156 to N. E. Oglesby, coat the maker coat with abrasive grain by any of the well-known methods of the prior art, and finally apply and cure a size coating composition according to the teachings of this invention. The compositions of my invention are particularly suitable for use as a size coat on products having a glue maker coat. The temperature required to cure the aminoplast compositions is not deleterious to the glue and excellent adhesion is obtained at the interface between the glue maker and the resin size.

Although my adhesives are particularly suitable as a size over glue made coated abrasives, I may also employ them as maker or size coats in conjunction with other suitable adhesives. For example, a waterproof product may be produced by employing phenol aldehyde resins, polyepoxy resins, etc. as the maker coat with a novel aminoplast composition of my invention as the size coat.

In many cases it is desirable to incorporate a filler material in the particle size range such as taught in U.S. Patent 2,322,156 to N. E. Oglesby in the maker and/or the size coating in the manufacture of coated abrasives according to my invention. I have found that contrary to the results when prior art certain curing agents for aminoplasts are employed, the addition of filler material to the aminoplast-curing agent composition of my invention does not interfere with the effectiveness of the cure.

I claim:

1. A coated abrasive comprising: a flexible backing member and abrasive grains bonded to one side of said backing by a maker and size coat of adhesive; at least one of said coats being the heat cured condensation product of a composition comprising initially a material selected from the group consisting of urea-formaldehyde pre-condensates, melamine-formaldehyde pre-condensates, and urea-melamine-formaldehyde pre-condensates; and a latent curing system consisting essentially of: an amino compound having at least one primary amino group attached to a tertiary carbon atom and an oxygen atom, selected from the group consisting of hydroxy oxygens and ether oxygens, attached to a carbon atom adjacent said tertiary carbon atom, and an ammonium salt of an acid, said acid having a dissociation constant of at least $1 \times 10^{-4}$; said amine being present in a quantity sufficient to raise the pH of the composition to a value of from 6 to 9 prior to cure.

2. A coated abrasive as in claim 1 wherein the said amino compound is 2-amino 2-methyl 1-propanol.

3. A coated abrasive as in claim 1 wherein the said amino compound is 2-amino 2-methyl 1,3-propanediol.

4. A coated abrasive as in claim 1 wherein the said amino compound is 5-amino 5-methyl 1,3-dioxane.

5. A coated abrasive as in claim 1 wherein the said amino compound is tris(hydroxymethyl)aminomethane.

6. A coated abrasive as in claim 1 wherein the said amino compound is 2-amino 2-ethyl 1,3-propanediol.

7. A coated abrasive as in claim 1 wherein the aminoplast is employed as a size adhesive over a glue maker coat.

References Cited in the file of this patent

UNITED STATES PATENTS

| | | |
|---|---|---|
| 2,378,362 | Ripper | June 12, 1945 |
| 2,467,160 | Scott | Apr. 12, 1949 |
| 2,561,973 | Cohen | July 24, 1951 |
| 2,684,346 | Nickerson | July 20, 1954 |
| 2,698,870 | Bloch et al. | Jan. 4, 1955 |
| 2,729,611 | Chesley et al. | Jan. 3, 1956 |
| 2,795,513 | Rossin | June 11, 1957 |
| 2,804,444 | Nickerson | Aug. 27, 1957 |